United States Patent
Avrunin

(10) Patent No.: US 9,009,845 B2
(45) Date of Patent: Apr. 14, 2015

(54) DISTRIBUTING ADVERTISEMENT-SUPPORTED SOFTWARE WHILE ENSURING CERTAIN SOFTWARE FREEDOMS BY LICENSE

(75) Inventor: Adam Avrunin, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1493 days.

(21) Appl. No.: 11/679,766

(22) Filed: Feb. 27, 2007

(65) Prior Publication Data

US 2008/0209573 A1 Aug. 28, 2008

(51) Int. Cl.
*H04L 9/00* (2006.01)
*G06F 21/10* (2013.01)
*G06Q 30/02* (2012.01)

(52) U.S. Cl.
CPC ............... *G06F 21/10* (2013.01); *G06Q 30/02* (2013.01)

(58) Field of Classification Search
CPC ...... G06Q 30/02; G06Q 30/0241; G06F 8/60; G06F 8/65; G06F 8/70; G06F 8/71; G06F 21/10; G06F 2221/0724
USPC ............... 705/14, 14.61, 14.4, 300, 310, 902, 705/903; 726/28, 26, 27, 29, 30; 717/120, 717/168, 171, 172
See application file for complete search history.

(56) References Cited

U.S. PATENT DOCUMENTS

| | | | | |
|---|---|---|---|---|
| 6,285,985 | B1* | 9/2001 | Horstmann | 705/14 |
| 6,578,199 | B1* | 6/2003 | Tsou et al. | 717/178 |
| 6,991,156 | B1* | 1/2006 | Somers, Jr. | 235/379 |
| 2002/0082913 | A1* | 6/2002 | Li | 705/14 |
| 2003/0101092 | A1* | 5/2003 | Fuller et al. | 705/14 |
| 2005/0005242 | A1* | 1/2005 | Hoyle | 715/745 |
| 2007/0033154 | A1* | 2/2007 | Trainum et al. | 707/1 |
| 2007/0156835 | A1* | 7/2007 | Pulkowski et al. | 709/207 |
| 2007/0276728 | A1* | 11/2007 | Bala | 705/14 |
| 2008/0091774 | A1* | 4/2008 | Taylor et al. | 709/203 |

OTHER PUBLICATIONS

GNU General Public License, Version 2, Jun. 1991, Copyright (c) 1989, 1991 Free Software Foundation, Inc. 59 Temple Place, Suite 330, Boston, MA 02111-1307.*
Pearson, Hilary E. "Open Source Licences: Open Source—the Death of Proprietary System'?." Computer Law & Security Review 16, No. 3 (2000): 151-156.*
Maynard, Glenn, Re: SugarCRM License Issue, Nov. 10, 2005, retrieved from http://permalink.gmane.org/gmane.linux.debian.devel.legal/23529 on Jul. 26, 2013.*
Fuggetta, Alfonso. "Open source software—an evaluation." Journal of Systems and Software 66.1 (2003): 77-90.*

* cited by examiner

*Primary Examiner* — Andrew W Johns
(74) *Attorney, Agent, or Firm* — Lowenstein Sandler LLP

(57) ABSTRACT

Embodiments related generally to a method of delivering software. The method includes providing the software that includes an advertising module. The software is distributed under a license, which requires the advertising module to be distributed and active with the software. The license may also permit modification of the software and/or redistribution of the software under similar licensing terms.

24 Claims, 2 Drawing Sheets

DISTRIBUTING ADVERTISEMENT-SUPPORTED SOFTWARE WHILE ENSURING CERTAIN SOFTWARE FREEDOMS BY LICENSE

FIELD OF THE INVENTION

The present invention relates to software distribution, and, more particularly, to methods and systems for licensing of advertisement-supported software.

DESCRIPTION OF THE RELATED ART

Open-source software is software distributed under a license ensuring that the recipient has various software freedoms, or rights, such as the right not only to use the code, but also to see the source code, to modify the code, and to redistribute the code. The license provides these rights without requiring that the recipient pay the distributor a royalty on the software. Some open-source licenses permit the recipient to do whatever they want with the code, including distributing it under a proprietary license that does not ensure those same rights to later recipients. Other open-source licenses are designed to ensure that later recipients have the same rights as the first recipient; they can do this, for example, by requiring that any distribution of the code and/or modified code be done under the same license or under a license with similar terms.

A fuller explanation of open-source licenses is provided by the Open Source Initiative ("OSI") at www.opensource.org, the text of which is hereby incorporated herein by reference. The Web site also provides an "Open Source Definition"(at www.opensource.org/docs/definition.php) that defines the characteristics a license must have to be an open-source license. Most of these characteristics relate to preserving various software freedoms, or rights, to recipients of the code.

Because of the software freedoms, or rights, ensured by the various open-source licenses, a community of developers may come together to quickly advance the development of software under such a license. At the same time, because the original developer and distributor of the software does not by license receive a royalty from downstream users and distributors of the software, he is limited in how he can recoup his investment in the original development of the software. In some instances, this has discouraged some developers and distributors from investing resources to develop or release a particular software application under normal open-source conditions.

Accordingly, it would be advantageous to have a way in which the original developer of a program could recoup his investment while at the same time preserving for downstream recipients of the program many of the rights to modify and redistribute the code that open-source licenses provide. Preserving such rights to downstream recipients would enable and encourage them to continue to develop the program, such as by adding bug fixes and adding new features.

BRIEF DESCRIPTION OF THE DRAWINGS

The accompanying drawings, which are incorporated in and constitute a part of this specification, illustrate embodiments of the invention and together with the description, serve to explain the principles of the invention. Following is a brief description of the drawings.

DETAILED DESCRIPTION OF THE EMBODIMENTS

Figure 1:
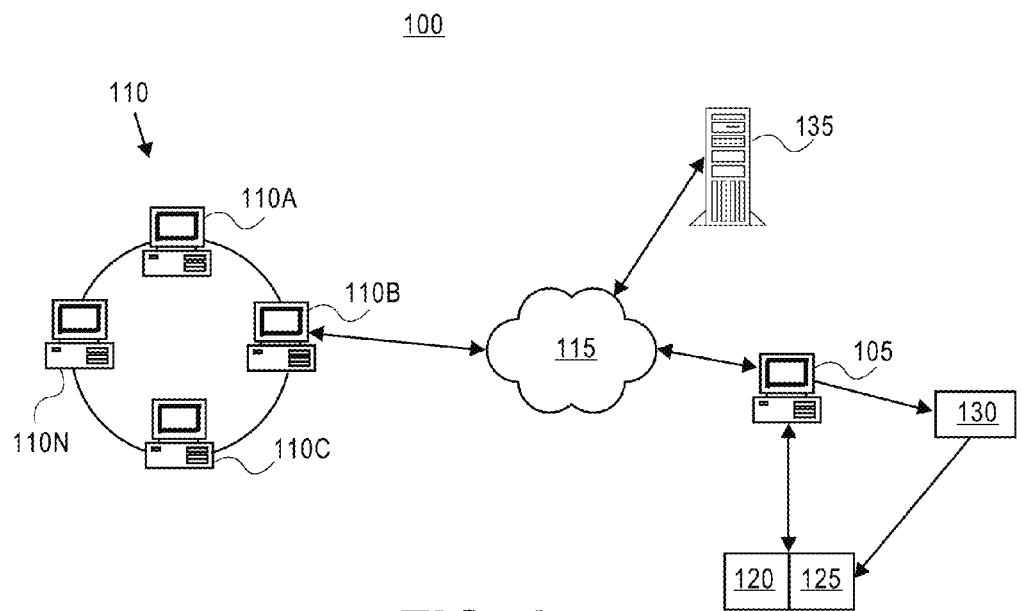
FIG. 1 illustrates an exemplary system for advertising supported software in accordance with embodiments of the present invention.

For simplicity and illustrative purposes, the principles of the present invention are described by referring mainly to exemplary embodiments thereof. However, one of ordinary skill in the art would readily recognize that the same principles are equally applicable to, and can be implemented in, all types of computer systems, and that any such variations do not depart from the true spirit and scope of the present invention. Moreover, in the following detailed description, references are made to the accompanying figures, which illustrate specific embodiments. Electrical, mechanical, logical, and structural changes may be made to the embodiments without departing from the spirit and scope of the present invention. The following detailed description is, therefore, not to be taken in a limiting sense, and the scope of the present invention is defined by the appended claims and their equivalents.

Embodiments relate generally to methods and systems by which an initial developer of a software program can recoup his investment, while at the same time encouraging a community of development around the program by using licensing techniques to preserve certain rights typically ensured by open-source licenses. More particularly, a developer of a software program can include an advertising module in the software application. The advertising module may display content, such as ads, to the user of the application. It may do so upon starting of the application, during execution of the application, or while the application is shutting down. The application may receive the ads from over the Internet, or it may come with a built-in store of ads in the advertising module. If it receives the ads from over the Internet, it may send back tracking information about the user or the display of the ad.

The software application and advertising module may be released as a single unit to a user community under a license. The license may permit the user community to modify, distribute, and/or use the software application, but may protect the advertising module. For example, the license may require that the advertising module is executed along with the software application, and may require that any modifications to the software do not disable operation of the advertising module. Accordingly, a developer of a software application can also release the source code associated with the software application and rely on the anticipated user community to develop and maintain the software application, as well as generating some amount of income for the original developer of the software, as the original developer may retain control of the content or ads served to the ad-serving module.

The license may lack any requirement that the recipient pay the distributor a royalty for use of the software. The license may also ensure that any downstream recipients need not pay any royalties, so long as the advertising module stays intact. The license may also ensure one or more of the other freedoms indicated in the OSI's "Open Source Definition," although the requirement in the license of keeping the advertising module intact likely makes the license described herein a deviation from the definition of an open-source license.

The license that specifies preservation of the ad-serving module and the other rights given to the recipient of the code may require that subsequent distributions of the software occur under the same or similar license, although it need not do so. The licensor of the software may require explicit assent to the license upon distributing the code to the recipient. Alternatively, the licensor may make the software available under the license, but not require explicit acceptance; in this case, use of the software constitutes implicit acceptance of the license.

Reference will now be made in detail to the exemplary embodiments of the invention, which are illustrated in the accompanying drawings. Wherever possible, the same reference numbers will be used throughout the drawings to refer to the same or like parts.

FIG. 1 illustrates an exemplary system 100 that is in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, system 100 can comprise a software provider 105 and a user community 110 that are coupled via a network 115. The software provider 105 generally represents any software developer, vendor, and/or distributor of software. For example, software provider 105 can provide a website on network 115 that allows a client in the user community 110 to download software. Such systems are well known to those skilled in the art using typical components of hardware, firmware, and software.

The user community 110 is generally a collection of users who use the software being distributed by the software provider 105. Although FIG. 1 shows user community 110 as a single entity, it should be understand that the actual users 110A-110N can be distributed across the globe and may not be related to each other in any way. Moreover, users 110A-110N can alternatively be computing platforms, such as those depicted in FIG. 2.

Figure 2:
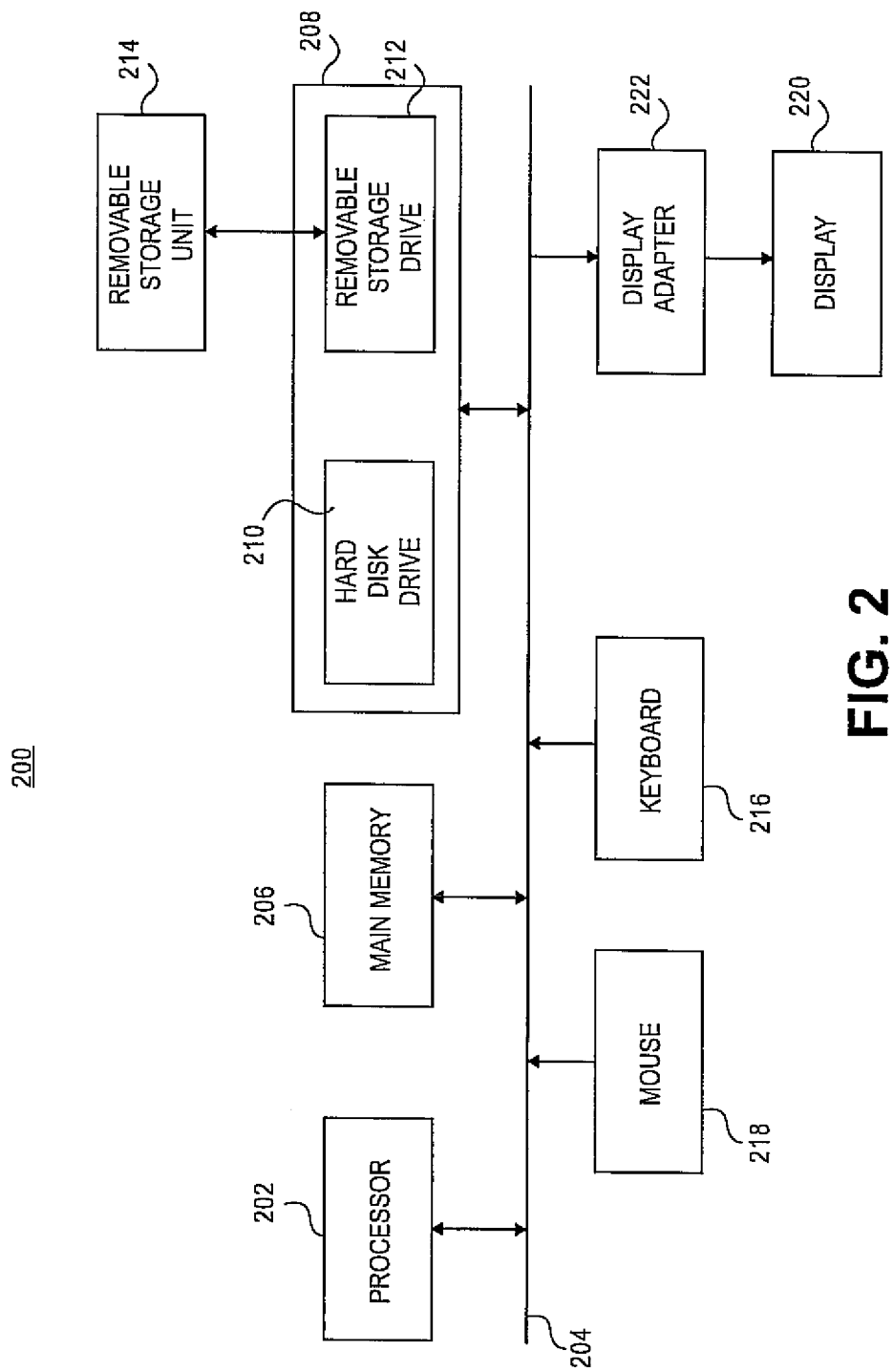
FIG. 2 illustrates an exemplary computing platform to support the system depicted in FIG. 1.

As shown in FIG. 2, the computer system 200 includes one or more processors, such as processor 202 that provides an execution platform for embodiments of the software application 120 and advertising module 125. Commands and data from the processor 202 are communicated over a communication bus 204. The computer system 200 also includes a main memory 206, such as a Random Access Memory (RAM), where the software application 120 and advertising module 125 can be executed during runtime, and a secondary memory 208. The secondary memory 208 includes, for example, a hard disk drive 210 and/or a removable storage drive 212, representing a floppy diskette drive, a magnetic tape drive, a compact disk drive, etc., where a copy of a computer program embodiment for the software application 120 and advertising module 125 may be stored. The removable storage drive 212 reads from and/or writes to a removable storage unit 214 in a well-known manner. A user interfaces with the software application 120 and advertising module 125 with a keyboard 216, a mouse 218, and a display 220. A display adapter 222 interfaces with the communication bus 204 and the display 220. The display adapter 222 also receives display data from the processor 202 and converts the display data into display commands for the display 220.

Returning to FIG. 1, the network 115 that connects the software provider 105 and the user community 110 can be the Internet, private networks, wide area networks, local area networks, or combinations thereof. The network 115 can be configured for the participants to communicate using network protocols such as TCP/IP, ATM, SONET, or any other networking protocols.

The software provider 105 can make available to the user community 110 a software application 120 to the users or clients 110A-110N of the user community 110 under a license 130. The license 130 can grant to the recipient many of the software freedoms, or rights—such as those often found in open-source licenses—to the software application 120. For example, the license may ensure that recipients of the software application 120 have the right to modify and redistribute the code. It may specify that recipients of the code have these rights without having to pay a royalty to anyone. At the same time, the license 130 can also require that the software application 120 be distributed with an advertising module 125 and place restrictions that ensure the advertising module 125 will not be disabled through one or more methods, such as modifying the code, using anti-spyware, failing to distribute the advertising module 125 with the software application 120, or some combination of such methods. By designing an appropriate advertising module, the original developer can maintain control of the ads provided to and/or displayed by the module, even though downstream recipients of the code may have modified and/or redistributed the code, perhaps multiple times.

The advertising module 125 can be configured to receive advertisements from the advertising server 135 and display the received advertisements on a display of the clients 110A-110N. The advertising server 135 can manage the advertisements, as well as account to the software provider 105 for the number of advertisements it displays. Accordingly, the software provider 105 can generate an amount of income based on the number of advertisements transmitted to various users of either the software application 120 and/or versions of the software application 120 that have been modified by others.

The income generated by the user of the software application 120 and the subsequent versions of the software application 120 may be dependent on the number of advertising modules 125 that are executing. As a result, the license 130 may require that the advertising module 125 be distributed with any version of the software application 120.

Figure 3:
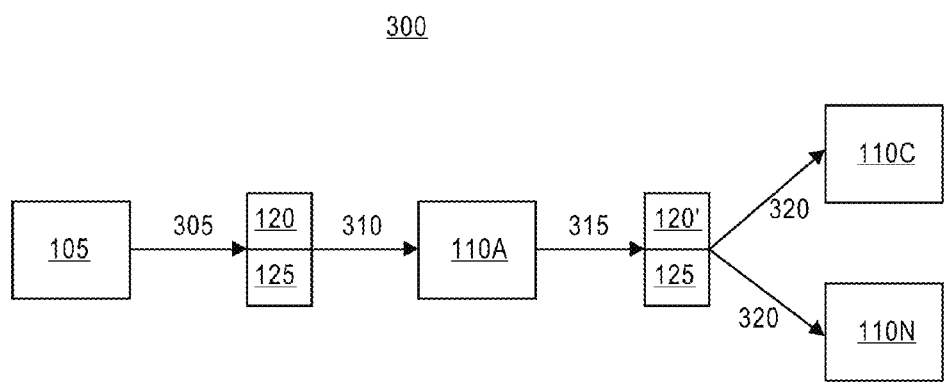
FIG. 3 depicts a process flow in accordance with an exemplary embodiment of the present invention.

FIG. 3 illustrates an exemplary process flow 300 in accordance with another embodiment. It should be readily apparent to those of ordinary skill in the art that the process flow 300 depicted in FIG. 3 represents a generalized schematic illustration and that other steps may be added or existing steps can be removed or modified.

As shown in FIG. 3, the software provider 105 has made the software application 120 and the advertising module 125 available to the public, in step 305. The software application 120 and the included advertising module 125 can be downloaded by users from a website or a secure location. The software application 120 and advertising module 125 may be distributed to the users in other ways, such as a computer-readable medium.

In step 310, a user, e.g., client 110A, has downloaded the software application 120 and the advertising module 125. As known by those skilled in the art, by the mere act of downloading, the client 110A has implicitly accepted the terms of the license 130 and now has to allow the advertising module 125 to execute while the software application 120 is executing. Alternatively, the client 110A may be required to explicitly assent to the license in order to receive the software application 120. Accordingly, the client 110A can receive and be displayed advertisements from the advertising server 135 through the advertising module 125.

In step 315, the client 110A has modified the software application 120 and made it available to the public. More particularly, the client 110A may have discovered a bug or error in the source code of the software application or developed new features for the software application 120. Accordingly, as a diligent user, the client 110A has modified the software application 120 to develop a new version of software application 120'.

Since client 110A accepted the original software application 120 under the license 130, the client 110A includes a fully functional advertising module 125 with the new version of software application 120', as the license 130 requires. If the license 130 required that the client 110A preserve the same software freedoms to later recipients, such as requiring that any redistribution occur under the same or a similar license, then the client 110A should comply with those requirements as well, as should all other downstream recipients.

In step 320, users of clients 110C and 110N can now download the new version of the software application 120' or the original version of the software application 120. Both versions are still configured to use advertising module 125 to display ads to the users 110C and 110N. In addition, users 110C and 110N may have received the software application 120 or 120' under a license that preserves operation of the advertising module in all subsequent redistributions, while preserving certain software freedoms (such as the right to modify and/or redistribute).

Certain embodiments may be performed as a computer program. The computer program may exist in a variety of forms. For example, the computer program can exist as software program(s) comprised of program instructions in source code, object code, executable code, or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through die Internet or other networks. Concrete examples of the foregoing include distribution of executable software program(s) of the computer program on a CD-ROM or via Internet download. In a sense, the Internet itself, as an abstract entity, is a computer-readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
    receiving, from a software provider device, a first version of software, the first version of the software comprising an advertising module that displays a plurality of advertisements on a computer;
    distributing the first version of the software under a license permitting modification of a portion of the software that (a) does not include the advertising module and (b) does not disable, modify, or impede operation of the advertising module and prohibiting modification of a portion of the software that does include the advertising module;
    receiving, by a processor and from a first client device other than the software provider device, a second version of the software, the second version of the software comprising a modification to code included in the first version of the software that does not disable, modify, or impede operation of the advertising module; and
    distributing, to a second client device other than the software provider device and the first client device, the second version of the software conditioned on execution of the advertising module in conjunction with the second version of the software,
    wherein the advertising module, when executed, receives the plurality of advertisements over a network and displays a first advertisement of the plurality of advertisements at a first instance and displays a second advertisement of the plurality of advertisements at a second instance.

2. The method of claim 1, wherein the license further prohibits disabling the operation of the advertising module during use.

3. The method of claim 1, wherein the license further prohibits disabling the operation of the advertising module using an anti-spyware program.

4. The method of claim 1, wherein the license permits redistribution of the software only under an identical license.

5. The method of claim 1, wherein the license permits redistribution of the software only under a second license having similar terms to those of the license.

6. The method of claim 1, wherein the license does not require payment of a royalty.

7. The method of claim 1, wherein the license does not require payment of a royalty, and the license permits redistribution of the software only under an identical license.

8. The method of claim 1, further comprising not requiring explicit acknowledgement of the license.

9. The method of claim 1, further comprising requiring explicit assent to the license.

10. The method of claim 1, further comprising enabling transmission of at least one advertisement of the plurality of advertisement to the advertising module over the network.

11. The method of claim 1, further comprising:
    providing a server to perform operations comprising:
        receiving a request for an advertisement from the advertising module;
        transmitting an advertisement to the advertising module; and
        storing information related to tracking advertisement transmissions.

12. The method of claim 1, wherein the advertising module displays at least one of the first advertisement or second advertisement upon at least one of: starting execution of the software, during the execution of the software, or upon terminating the execution of the software.

13. The method of claim 1, wherein the advertising module, when executed, receives the plurality of advertisements over the network from an advertising server and sends tracking information to the advertising server.

14. A non-transitory computer-readable storage medium including processor-executable instructions that when executed cause a processor to perform operations comprising:
    receiving, from a software provider device, a first version of a software application, the first version of the software application comprising an advertising module to receive a plurality of advertisements over a computer network and to display the plurality of advertisements; and distributing the first version of the software application under a license permitting modification of a portion of the software application that (a) does not include the advertising module, and (b) does not disable, modify, or impede operation of the advertising module and prohibiting modification of a portion of the software application that does include the advertising module;

receiving, by the processor and from a first client device other than the software provider device, a second version of the software application, the second version of the software application comprising a modification to code included in the first version of the software application that does not disable, modify, or impede operation of the advertising module; and distributing, to a second client device other than the software provider device and the first client device, the second version of the software application conditioned on execution of the advertising module in conjunction with the second version of the software application, wherein the advertising module, when executed, receives the plurality of advertisements over the computer network and displays a first advertisement of the plurality of advertisements at a first instance and displays a second advertisement of the plurality of advertisements at a second instance.

15. The non-transitory computer-readable storage medium of claim 14, wherein the license further requires distribution of the second version of the software application under a second license providing similar rights and restrictions as the license.

16. The non-transitory computer-readable storage medium of claim 14, wherein the advertising module is further to receive the plurality of advertisements in response to execution of the second version of the software application.

17. The non-transitory computer-readable storage medium of claim 14, wherein the advertising module is further to display the plurality of advertisements.

18. The non-transitory computer-readable storage medium of claim 14, wherein the advertising module is further to receive the plurality of advertisements from an advertising server.

19. The non-transitory computer-readable storage medium of claim 18, wherein the advertising server is further to store information for tracking advertisement transmissions.

20. The non-transitory computer-readable storage medium of claim 14, wherein the license is in a file.

21. The non-transitory computer-readable storage medium of claim 20, wherein the file is included on the non-transitory computer-readable storage medium.

22. A method comprising:

providing, by a software provider device, a first version of a software application, the first version of the software application comprising an advertising module that displays a plurality of advertisements on a computer in response to execution of the software application;

distributing the first version of the software application under a license permitting modification of a portion of the software application that (a) does not include the advertising module and (b) does not disable, modify, or impede operation of the advertising module and prohibiting modification of a portion of the software application that does include the advertising module;

providing, by a processor and from a first client device other than the software provider device, a second version of the software application, the second version of the software application comprising a modification to code included in the first version of the software application that does not disable, modify, or impede operation of the advertising module; and distributing, to a second client device other than the software provider device and the first client device, the second version of the software application conditioned on execution of the advertising module in conjunction with the second version of the software application, wherein the advertising module, when executed, receives the plurality of advertisements over a network and displays a first advertisement of the plurality of advertisements at a first instance and displays a second advertisement of the plurality of advertisements at a second instance.

23. The method of claim 22, further comprising enabling transmission of an advertisement to the software application.

24. The method of claim 22, further comprising enabling transmission of an advertisement to a modified version of the software application.

* * * * *